US011305622B2

(12) United States Patent
Kerschbaum

(10) Patent No.: US 11,305,622 B2
(45) Date of Patent: Apr. 19, 2022

(54) STABILIZATION DEVICE FOR SEALING A MIRROR TRIANGLE, AND SEALING ASSEMBLY PROVIDED WITH THE STABILIZATION DEVICE

(71) Applicant: Bayerische Motoren Werke Aktiengesellschaft, Munich (DE)

(72) Inventor: Christian Kerschbaum, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 186 days.

(21) Appl. No.: 16/762,572

(22) PCT Filed: Dec. 4, 2018

(86) PCT No.: PCT/EP2018/083409
§ 371 (c)(1),
(2) Date: May 8, 2020

(87) PCT Pub. No.: WO2019/110544
PCT Pub. Date: Jun. 13, 2019

(65) Prior Publication Data
US 2020/0361294 A1 Nov. 19, 2020

(30) Foreign Application Priority Data
Dec. 6, 2017 (DE) ..................... 10 2017 222 067.8

(51) Int. Cl.
*B60J 5/04* (2006.01)
*B60J 10/70* (2016.01)
(Continued)

(52) U.S. Cl.
CPC ............. *B60J 5/0404* (2013.01); *B60J 10/36* (2016.02); *B60J 10/70* (2016.02); *B60J 10/78* (2016.02);
(Continued)

(58) Field of Classification Search
CPC .. B60J 1/17; B60J 5/0404; B60J 10/36; B60R 1/006; B60R 1/06
(Continued)

(56) References Cited

U.S. PATENT DOCUMENTS 4,432,167 A * 2/1984 Watanuki ............... B60J 5/0404
49/502
4,969,295 A * 11/1990 Nishikawa ............. B60J 5/0402
296/146.2
(Continued)

FOREIGN PATENT DOCUMENTS

DE 44 22 010 A1 3/1995
DE 199 26 955 A1 4/2001
(Continued)

OTHER PUBLICATIONS

International Search Report (PCT/ISA/210) issued in PCT Application No. PCT/EP2018/083409 dated Feb. 20, 2019 with English translation (six (6) pages).
(Continued)

*Primary Examiner* — Jason S Morrow
(74) *Attorney, Agent, or Firm* — Crowell & Moring LLP

(57) ABSTRACT

A stabilization device stabilizes the region at the tip of a mirror triangle seal which is secured to a cover of the mirror triangle of a frameless vehicle door of a motor vehicle in the vehicle transverse direction. The stabilization device includes a fastening element for securing to the cover of the mirror triangle and a contact element for contacting the inner face of the tip of the seal. The contact element can be arranged and fixed so as to protrude upwards in the vehicle vertical direction such that the seal remains fixed to the cover when the vehicle door is opened despite a force acting inwards, which force is exerted onto the tip of the seal by a vehicle door window pane which is pretensioned inwards.

10 Claims, 3 Drawing Sheets

(51) Int. Cl.
*B60J 10/36* (2016.01)
*B60R 1/06* (2006.01)
*B60J 10/78* (2016.01)
*B60J 1/10* (2006.01)

(52) U.S. Cl.
CPC . *B60R 1/06* (2013.01); *B60J 1/10* (2013.01); *B60J 5/0402* (2013.01)

(58) Field of Classification Search
USPC ......................................................... 296/1.11
See application file for complete search history.

(56) References Cited

U.S. PATENT DOCUMENTS

| | | | |
|---|---|---|---|
| 5,404,677 A | 4/1995 | Umeda | |
| 6,422,639 B1 | 7/2002 | Hemauer | |
| 8,506,098 B2* | 8/2013 | Murata | B60J 5/0404 |
| | | | 359/871 |
| 10,000,111 B2* | 6/2018 | Makita | B60J 5/0404 |
| 10,150,354 B2* | 12/2018 | Brancaleone | B60J 5/0404 |
| 2006/0163895 A1* | 7/2006 | Nakazawa | B60R 1/06 |
| | | | 296/1.11 |
| 2011/0194201 A1* | 8/2011 | Muramatsu | B60R 1/06 |
| | | | 359/871 |
| 2020/0276889 A1* | 9/2020 | Kimura | B60J 1/17 |
| 2021/0260971 A1* | 8/2021 | Hatta | B60J 1/17 |

FOREIGN PATENT DOCUMENTS

| | | |
|---|---|---|
| EP | 1 852 292 B1 | 9/2010 |
| JP | 61-81221 A | 4/1986 |
| JP | 61-92918 A | 5/1986 |
| JP | 5-68721 U | 9/1993 |
| JP | 2016-141286 A | 8/2016 |

OTHER PUBLICATIONS

German-language Written Opinion (PCT/ISA/237) issued in PCT Application No. PCT/EP2018/083409 dated Feb. 20, 2019 (five (4) pages).

German-language Search Report issued in German Application No. 10 2017 222 067.8 dated Jul. 9, 2018 with partial English translation (15 pages).

* cited by examiner

STABILIZATION DEVICE FOR SEALING A MIRROR TRIANGLE, AND SEALING ASSEMBLY PROVIDED WITH THE STABILIZATION DEVICE

BACKGROUND AND SUMMARY OF THE INVENTION

The present invention relates to a stabilization device for stabilizing the region at the tip of the seal of a mirror triangle of a frameless vehicle door of a motor vehicle, said seal being fastened to a cover of the mirror triangle, and to a sealing assembly of such a mirror triangle.

It is conventional in particular in the case of convertibles to use what are referred to as frameless vehicle doors. In the case of such frameless vehicle doors, the uppermost part of the frame of a conventional vehicle door is omitted for aesthetic reasons. In order to always ensure that a vehicle equipped with such a frameless vehicle door is leakproof, the relevant window is provided with inwardly directed window pretensioning. When the vehicle door is opened, the side window here falls inward, as a result of which the seal of the mirror triangle, said seal being designed as a contact lip, may be pulled off from the mirror foot tip, which is positioned at the top, inward, i.e. in the transverse direction of the vehicle, which is often also referred to as the Y direction. The seal of the mirror triangle frequently follows this movement because of the capillary effect and can then no longer spring back or "snap back" into the starting position.

One option for counteracting this problem consists in keeping the overlapping of the seal with the external mirror to such a short length that the seal can spring back again. However, this is unsatisfactory since, in practice, problems occur time and again with, for example, seals which have turned over.

The present invention is based on the object of avoiding the abovementioned problem of the seal lifting off from the mirror foot and of providing a robust system in which the lifting off is reliably prevented.

This object is achieved with a stabilization device and with a sealing assembly, which is provided with the stabilization device, according to the claimed invention.

According to the invention, the stabilization device for stabilizing the region at the tip of the seal of a mirror triangle of a frameless vehicle door of a motor vehicle, said seal being fastened to a cover of the mirror triangle, in the transverse direction of the vehicle comprises a fastening element for fastening to the cover of the mirror triangle, and a contact element for making contact with the inner side of the tip of the seal. The assembly is designed in such a manner that the contact element can be arranged and fixed protruding upward in the vertical direction of the vehicle in such a manner that, when the vehicle door is opened, the seal remains fixed to the cover despite an inwardly acting force which is exerted on the tip of the seal, in particular in the form of a capillary force, by an inwardly pretensioned window of the vehicle door. As a result, the contact element of the stabilization device absorbs the force exerted on the seal by the capillary effect. In other words, when the vehicle door is opened, the seal is therefore not pulled off or lifted off from the mirror foot, but remains in place on the mirror foot or on the cover thereof.

According to an advantageous development of the invention, the contact element has a latching projection for producing a releasable latching connection to the region of the tip of the seal. This affords the advantage that a very robust connection can be produced between the contact element and the seal. Alternatively or additionally, it can be of advantage if the contact element has an undercut portion for producing a form-fitting connection to the region of the tip of the seal. This measure also makes it possible to improve the stability of the connection between the contact element and the seal.

A particularly simple and cost-effective manner of production arises if the stabilization device is formed integrally with the cover.

According to the invention, the sealing assembly for sealing a mirror triangle of a frameless vehicle door of a motor vehicle comprises a cover of the mirror triangle and a seal which is fastened to the cover. The sealing assembly is distinguished in that an abovementioned stabilization device is provided on the cover, wherein the contact element is arranged and fixed protruding upward in the vertical direction of the vehicle in such a manner that it lies against the inner side of the tip of the seal, wherein the assembly is designed in such a manner that, when the vehicle door is opened, the seal remains fixed to the cover despite an inwardly acting force which is exerted on the tip of the seal by an inwardly pretensioned window of the vehicle door. This gives rise to the same advantages as have already been described in conjunction with the stabilization device.

According to an advantageous development, the seal in the sealing assembly comprises a recess into which the contact element is inserted. The contact element thereby remains concealed from the sight of the observers, such as in particular the occupants of the motor vehicle concerned. In addition, if the recess is correspondingly configured with a complementary shape, stabilization and fixing of the seal provided with the recess can additionally also be obtained in the X direction, i.e. in the longitudinal direction of the vehicle.

A further advantageous development of the sealing assembly according to the invention is distinguished in that an additional cavity which is connected to the recess and into which the latching projection is latched is provided in the seal. As a result, firstly, the production of the vehicle door, i.e. in particular the mounting of the seal on the cover of the mirror triangle, can be performed in a simple and cost-effective manner and, secondly, a stable, but nevertheless releasable, connection can be produced between the seal and the cover. Similar advantages arise if, according to a further advantageous development, the seal in the region of its tip has an undercut portion which forms a form-fitting connection to the undercut portion of the contact element.

Additionally or alternatively, the contact element and the seal can be connected in a force-fitting manner to each other. Said force fit can be obtained, for example, by corresponding compression of the seal by introduction of the contact element into a recess, the clear width of which is smaller than the thickness of the contact element, as a result of which the contact element can only be pulled out of the recess by overcoming the increased frictional force because of the compression.

Alternatively, the contact element can be adhesively bonded to the seal.

The object mentioned at the beginning is also achieved by a vehicle door of a motor vehicle, which vehicle door is provided with a sealing assembly according to the invention, or a motor vehicle equipped therewith. Accordingly, the same or similar advantages as in conjunction with what has been described above also arise, and therefore, in order to avoid repetitions, reference is made to the above embodiments in conjunction with the device according to the invention.

A number of advantageous embodiments of the invention will be explained by way of example below with reference to the figures.

DETAILED DESCRIPTION OF THE DRAWINGS

Figure 1:
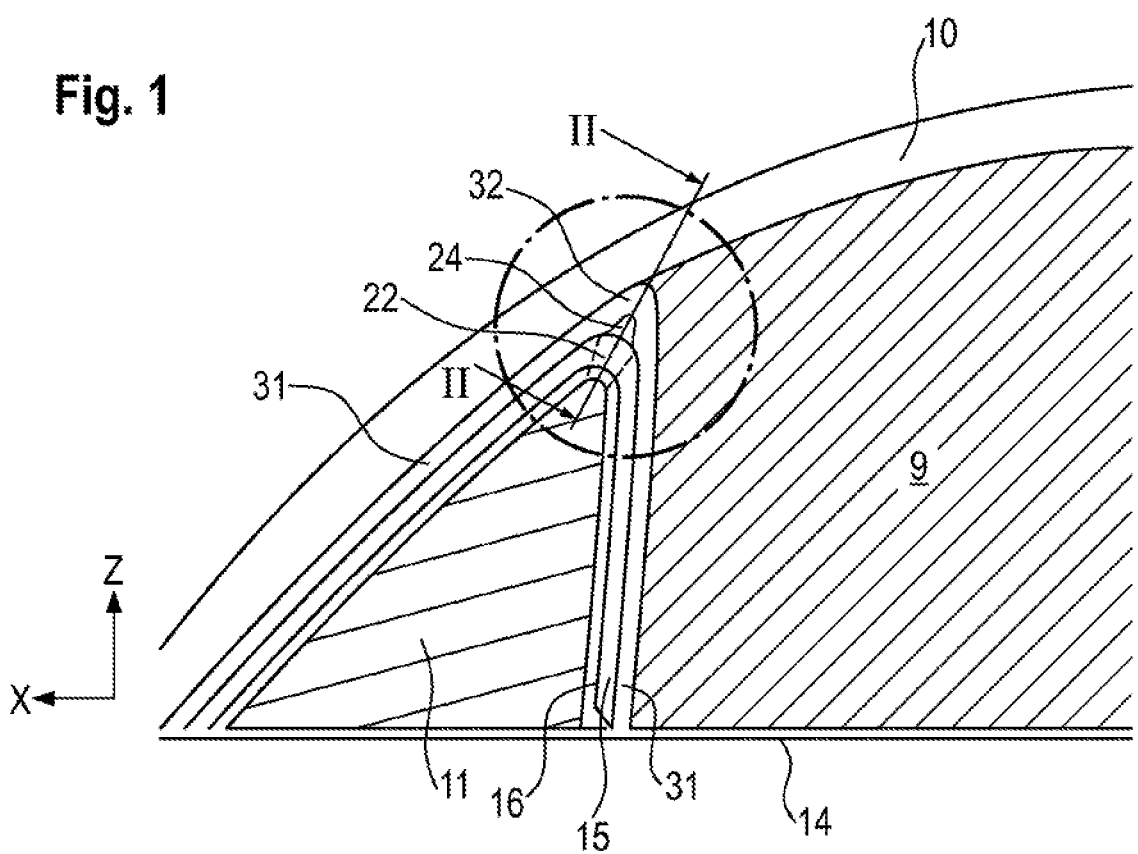
FIG. 1 is a schematic side view of a side window and of the associated mirror triangle with a fitted external mirror of a motor vehicle.
Figure 2:
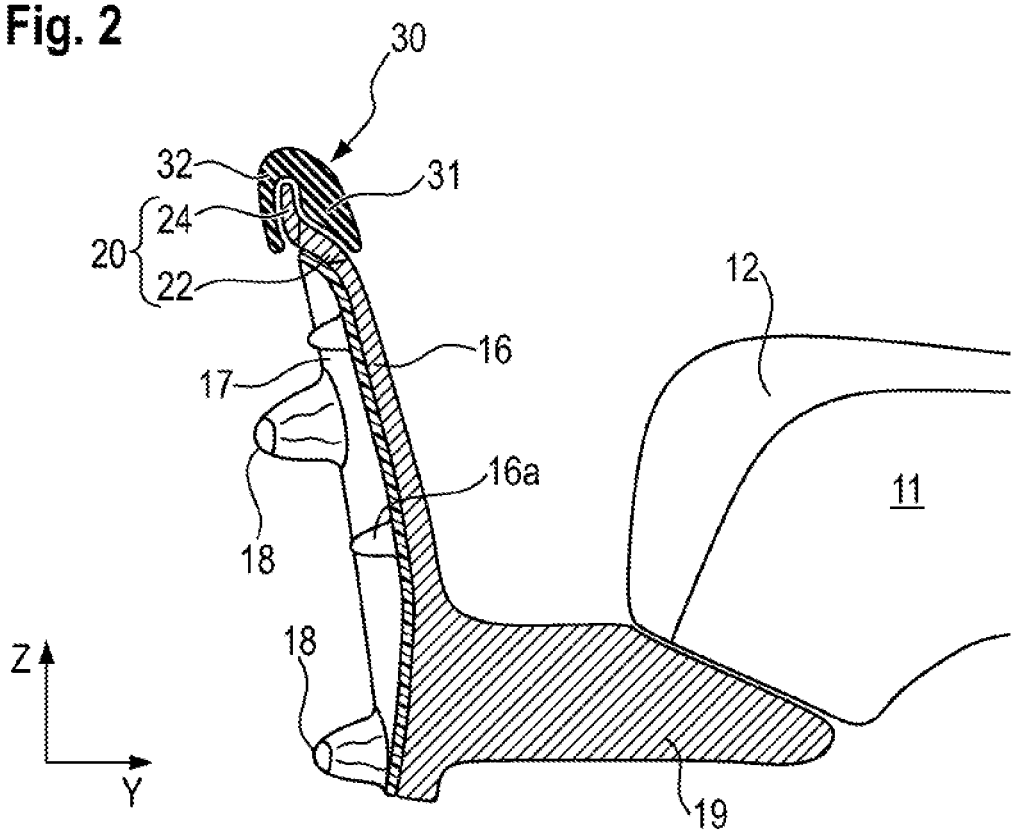
FIG. 2 is an enlarged sectional view along the line II-II from FIG. 1.
Figure 3:
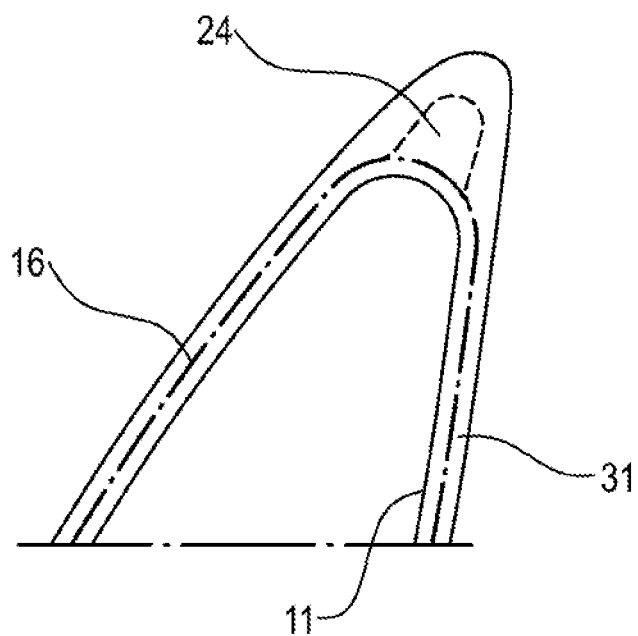
FIG. 3 is an enlarged detailed view, corresponding to the circle from FIG. 1, of the mirror triangle with the mirror and the seal, wherein the contour of the cover is illustrated.
Figure 4:
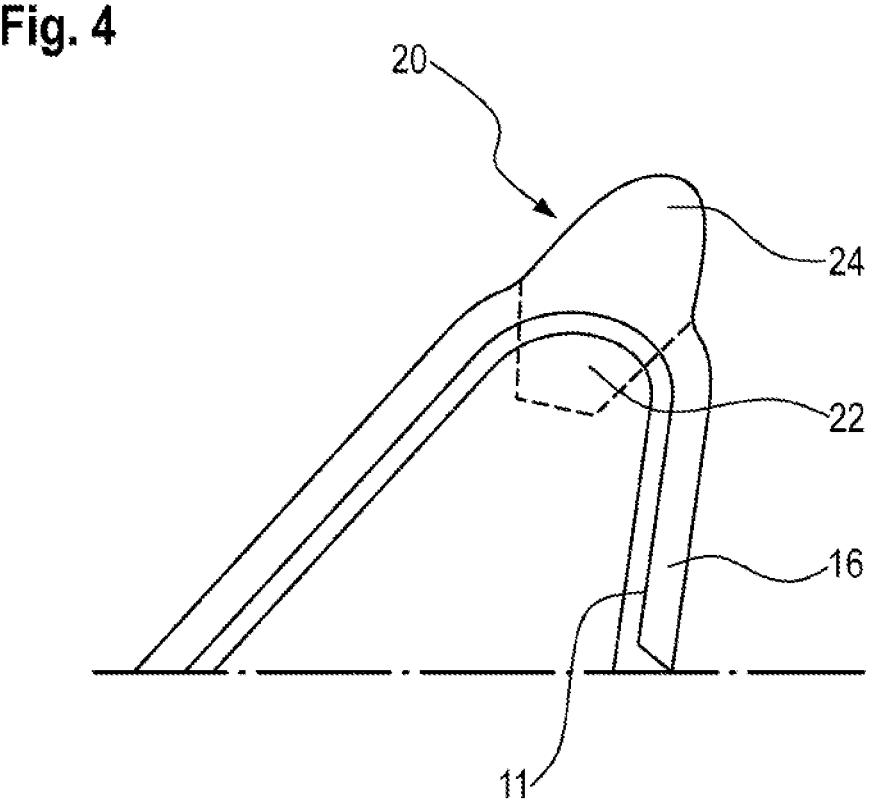
FIG. 4 is an enlarged detailed view, corresponding to the circle from FIG. 1, of the mirror triangle, wherein the seal is omitted.

FIG. 1 schematically illustrates a side window 9 with the associated mirror 11 which is mounted on a corresponding cover 16 of a mirror triangle 15 of a vehicle door 14 of a motor vehicle 10 (of which only the roof is illustrated). The mirror triangle 15 is sealed in relation to the side window 9 by means of a seal 31. The stabilization device 20 with its two components—the contact element 24 and the fastening element 22, which stabilization device is illustrated in more detail in FIG. 2, is arranged in the region of the tip 32 of the seal 31. To simplify the spatial orientation, the longitudinal direction of the vehicle, also referred to as the X direction, and the vertical direction of the vehicle, also referred to as the Z direction, are referred to by respective arrows.

Figure 5:
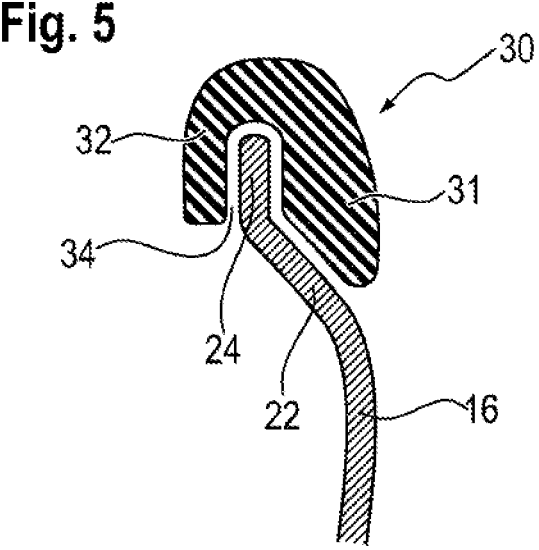
FIG. 5 is an enlarged illustration of a first embodiment of the sealing assembly with the contact portion and the seal.

As is apparent from the sectional illustration of FIG. 2, the stabilization device 20 is designed as an (angled) continuation of the cover 16 of the mirror triangle. Put more precisely, the stabilization device 20 comprises a contact element 24 and a fastening element 22 with which the contact element 24 is fastened to the cover 16. According to the illustration in FIG. 2, the contact element 24 and the fastening element 22 are separate components. The fastening can be undertaken here, for example, by casting, injection molding, integral forming or adhesive bonding. Alternatively, it is also possible for the contact element 24, the fastening element 22 and the cover 16 to be produced as a single workpiece, for example by injection molding. The contact element 24 lies here against the inner side of the seal 31 and therefore supports the latter in the transverse direction of the vehicle, which is also referred to as the Y direction, as is symbolized by a corresponding arrow in FIG. 2. As illustrated in FIG. 2 and can be seen better in the enlarged illustration of FIG. 5, the contact element 24 not only lies against the inner side of the seal 31, but is inserted into a recess 34 which is provided at the tip 32 of the seal 31. The stabilization device 20 together with the cover 16 and the seal 31 fastened thereto forms the sealing assembly 30.

For clarification purposes, it should also be explained here that the cover 16 continues in its lower region into a mirror foot extension arm 19 which protrudes outward transversely with respect to the direction of extent of the cover and on which the mirror 11, of which primarily the mirror head 12 is illustrated here, is mounted. The cover 16 in turn is fastened by means of fastening domes 16a to a mirror foot supporting structure 17 by associated screw-on domes 18.

If the (frameless) vehicle door 14 is now opened and the window 9 falls inward, in which case there is the tendency because of the capillary force for the window 9 to tear along the seal inward and to detach it from the cover 16, the contact element 24 supports the seal 31 and reliably prevents detaching of the seal 31—in particular of the tip 32 thereof—from the cover 16.

Figure 6:
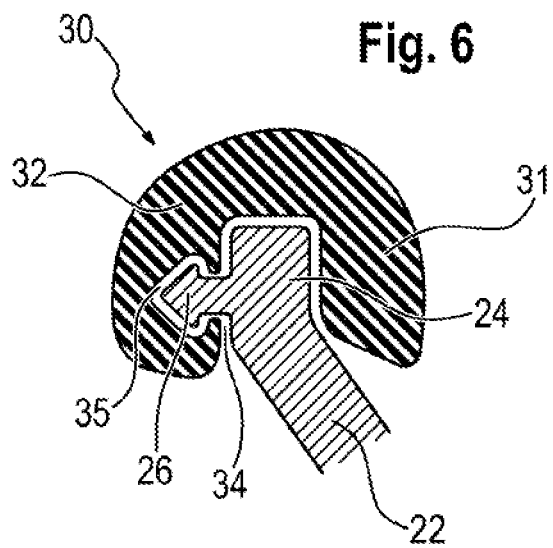
FIG. 6 is an illustration corresponding to FIG. 5 of a second embodiment of the sealing assembly.

FIG. 6 illustrates a second embodiment of the sealing assembly 30 according to the invention. The contact element 24 is provided here with a latching projection 26 which, for example, is of mushroom-shape design and extends from the contact element 24 in the transverse direction of the vehicle. Said latching projection 26 can be plugged or latched into an additional cavity 35 which is formed in the region of the tip 32 of the seal 31 and is connected to the recess 34. By latching of the latching projection 26 in the cavity 35, first of all a connection to be produced simply and securely between the seal 31 and the contact element 24 and therefore the cover 16 can be brought about. Secondly, this connection when required—for example if the seal 31 needs to be exchanged or in the event of a corresponding assembly operation—can be detached without being destroyed and optionally restored later.

Figure 7:
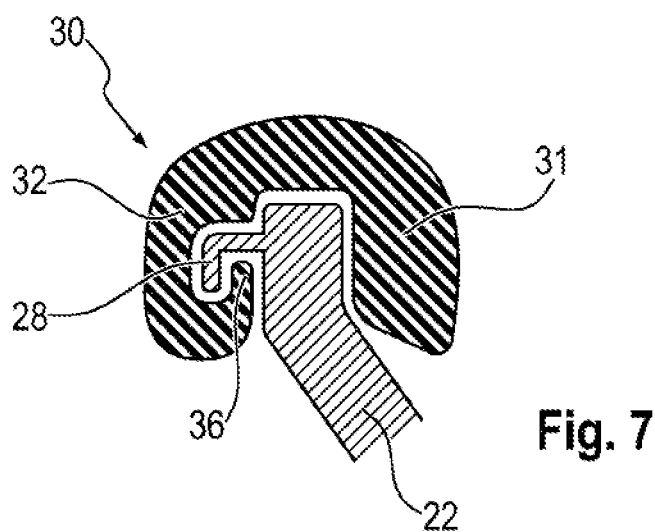
FIG. 7 is an illustration corresponding to FIG. 5 of a third embodiment of the sealing assembly.

FIG. 7 illustrates a third embodiment of the sealing assembly 30 according to the invention. The contact element 24 here has an undercut portion 28 which is configured in the form of a downwardly angled hook. Furthermore, the seal 31 has an undercut portion 36 which is at least substantially complementary in shape to the undercut portion 28 and is likewise of angled design and engages around the undercut portion 28 from below. This produces a form-fitting connection between the undercut portion 28 of the contact element 24 and the undercut portion 36 of the seal 31. Said form-fitting connection like the latching connection illustrated with reference to FIG. 6 can be produced in a simple manner and can be released again without being destroyed.

In the case of the connections formed according to FIGS. 6 and 7 between the seal 31 and the contact element 24, the strength of the connection can also be increased by the fact that the respective latching projection 26 and undercut portion 28 are dimensioned in such a manner that, when the form fit with the additional cavity 35 or the undercut portion 36 is produced, they compress the seal 31 to a certain degree. The effect achieved by compressing the seal 31 is that the frictional force between the compressed seal 31 and the latching projection 26 or the undercut portion 28 makes it additionally difficult to detach the corresponding connection and therefore increases the strength of the connection.

It goes without saying that the seal 31 can also be adhesively bonded to the contact element 24—and optionally to further components present there, such as, for example, a latching projection 26 or an undercut portion 28—if this is required for technical reasons and destruction-free release of the connection obtained can be dispensed with.

It should be emphasized that the features of the invention described with reference to individual embodiments or variants, such as, for example, type and configuration of the seal, on the one hand, and of the stabilization device, on the other hand, and also the spatial arrangement thereof may also be present in other embodiments unless indicated otherwise or prohibited per se for technical reasons. In addition, not necessarily all of the features of such features, described in combination, of individual embodiments always have to be realized in a relevant embodiment.

What is claimed is:

1. A stabilization device for stabilizing a region at a tip of a seal of a mirror triangle of a frameless vehicle door of a motor vehicle, said seal being fastened to a cover of the mirror triangle, in a transverse direction of the vehicle, comprising:
   a fastening element for fastening to the cover of the mirror triangle; and
   a contact element for making contact with an inner side of the tip of the seal, which contact element is arranged and fixed protruding upward in a vertical direction of the vehicle such that, when the vehicle door is opened, the seal remains fixed to the cover despite an inwardly acting force which is exerted on the tip of the seal by an inwardly pretensioned window of the vehicle door.

2. The stabilization device according to claim 1, wherein the contact element has a latching projection for producing a releasable latching connection to the region of the tip of the seal.

3. The stabilization device according to claim 1, wherein the contact element has an undercut portion for producing a form-fitting connection to the region of the tip of the seal.

4. The stabilization device according to claim 1, wherein the fastening element and contact element are formed integrally with the cover.

5. A sealing assembly for sealing a mirror triangle of a frameless vehicle door of a motor vehicle, comprising:
   a cover of the mirror triangle;
   a seal which is fastened to the cover; and
   a stabilization device provided on the cover, wherein the stabilization device comprises:
     a fastening element for fastening to the cover of the mirror triangle; and
     a contact element for making contact with an inner side of the tip of the seal, which contact element is arranged and fixed protruding upward in a vertical direction of the vehicle such that, when the vehicle door is opened, the seal remains fixed to the cover despite an inwardly acting force which is exerted on the tip of the seal by an inwardly pretensioned window of the vehicle door.

6. The sealing assembly according to claim 5, wherein the seal comprises a recess into which the contact element is inserted.

7. The sealing assembly according to claim 5, wherein an additional cavity is connected to the recess of the seal, into which a latching projection of the contact element is latched.

8. The sealing assembly according to claim 6, wherein the seal has, in the region of its tip, an undercut portion which forms a form-fitting connection to an undercut portion of the contact element.

9. The sealing assembly according to claim 5, wherein the contact element is connected in a force-fitting manner to the seal.

10. The sealing assembly according to claim 5, wherein the contact element is adhesively bonded to the seal.

* * * * *